Figure 1:
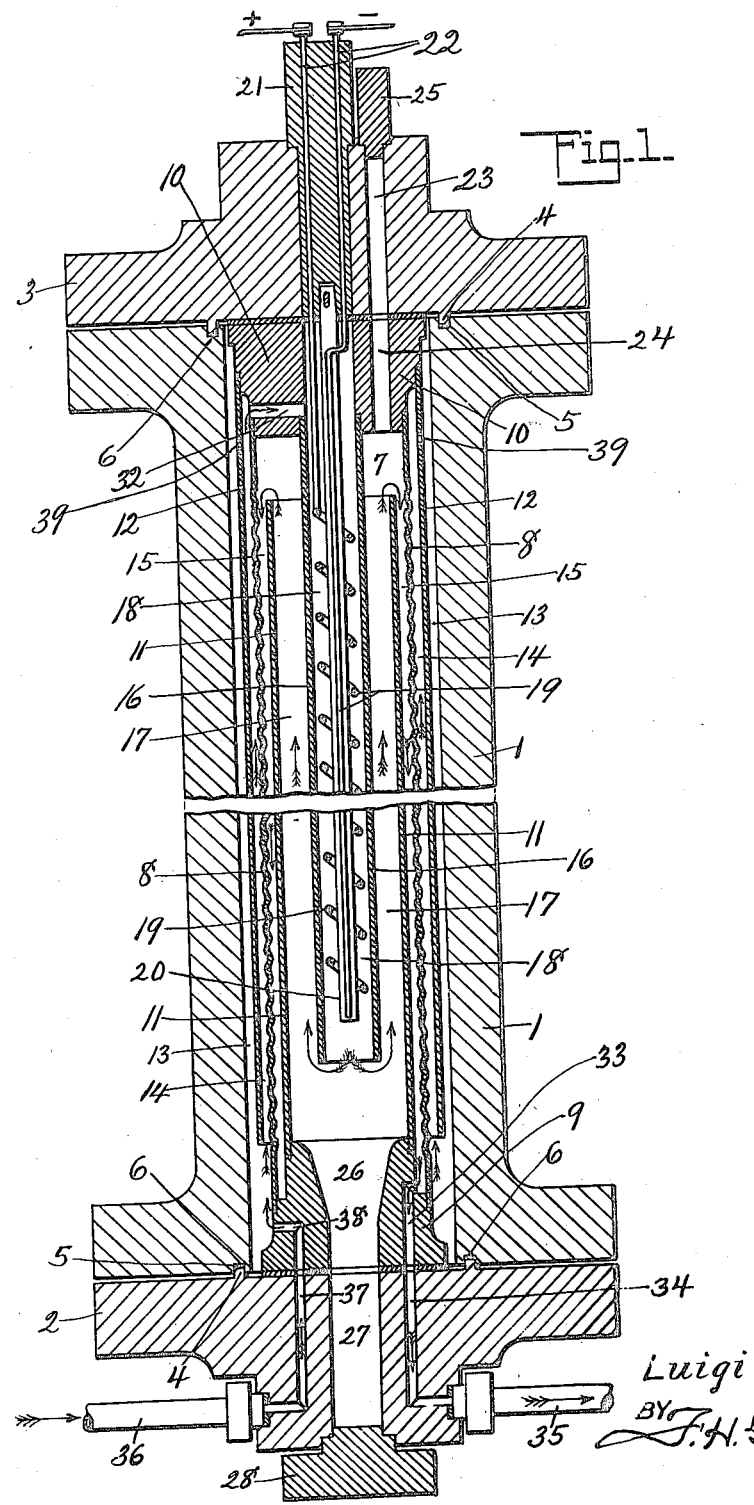

Dec. 25, 1923.

L. CASALE 1,478,550

CATALYTIC APPARATUS FOR THE SYNTHESIS OF AMMONIA

Filed June 26, 1922    2 Sheets-Sheet 1

INVENTOR:
Luigi Casale
BY J. H. Gibbs
ATTORNEY.

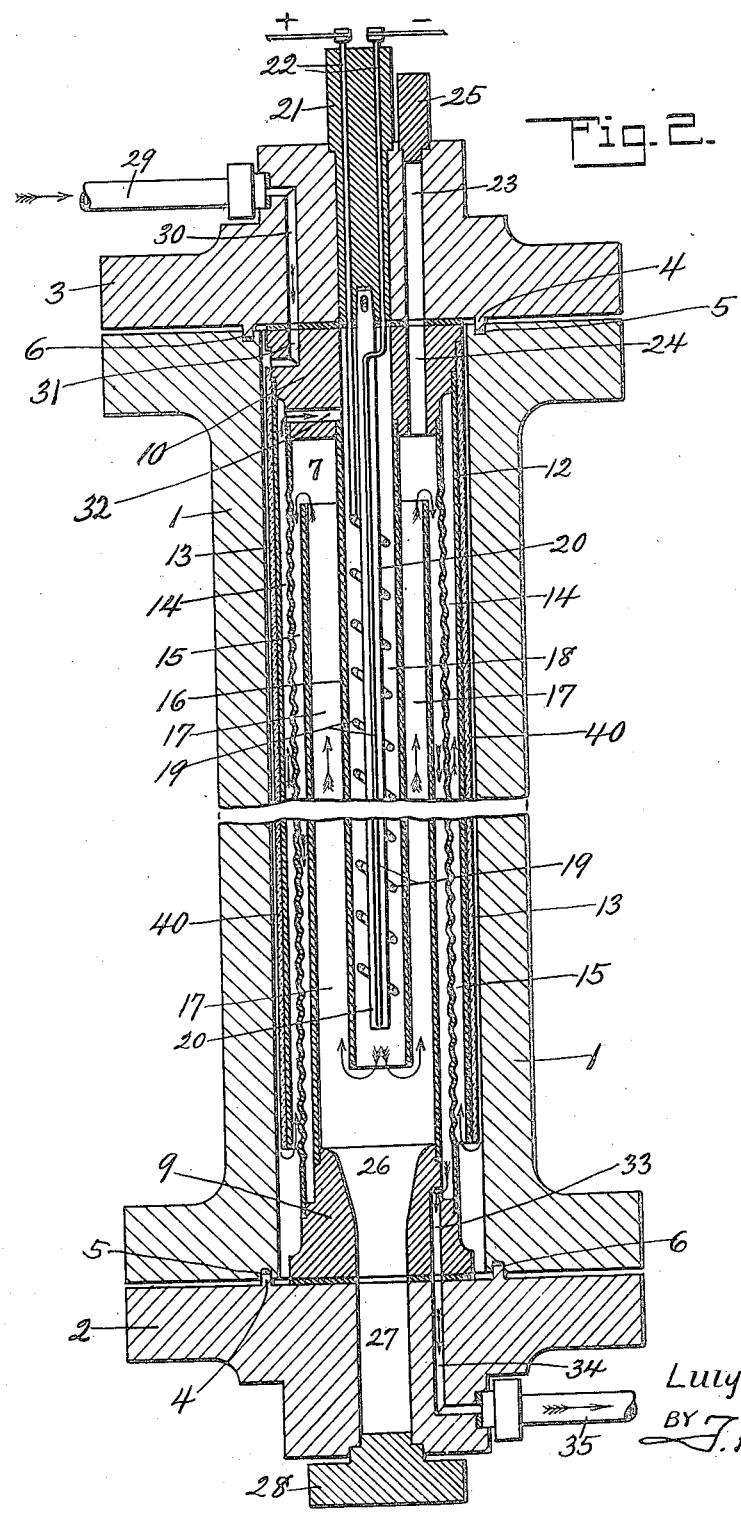

Patented Dec. 25, 1923.

1,478,550

UNITED STATES PATENT OFFICE.

LUIGI CASALE, OF ROME, ITALY, ASSIGNOR, BY DIRECT AND MESNE ASSIGNMENTS, TO CASALE AMMONIA COMPANY, OF LUGANO, SWITZERLAND.

CATALYTIC APPARATUS FOR THE SYNTHESIS OF AMMONIA.

Application filed June 26, 1922. Serial No. 571,036.

*To all whom it may concern:*

Be it known that I, LUIGI CASALE, a subject of the King of Italy, and a resident of Rome, Italy, have invented certain new and useful Improvements in Catalytic Apparatus for the Synthesis of Ammonia, of which the following is a specification.

In the drawings forming part of this specification Fig. 1 is a central vertical section of my device; and Fig. 2 is a similar view of a modified form of my device.

According to the present invention, I have designed a new apparatus for the synthesis of ammonia from its elements in which the reaction chamber is situated within the heat recuperator and the heater element is placed in a tube located in the center of the reaction chamber and the whole is so arranged that no part which is subjected to pressure can reach such a temperature that its strength is diminished. Moreover in this apparatus it is possible to withdraw and replace the catalytic substance by means of suitable openings in the closures of the pressure sustaining tube.

It is an object of my invention to provide an improved means for holding the catalytic agent for the synthesis of ammonia. It is also an object of my invention to provide a device of the type described in which the pressure sustaining element or tube will not be subjected to gases at high temperatures at any time during the process; which will permit of the removal of the electrical resistance element used for heating the gases without disturbing the connections by which the gases are supplied to the device and without the removal of the catalytic agent from the device; and which will permit of the removal of the catalytic agent from the device and the supplying of fresh catalytic agent without disturbing the electrical resistance element or breaking the connections by which the gases are supplied to the device.

With these and other objects in view, my invention, which is an improvement on the devices shown in my Patent No. 1,408,987, issued March 7, 1922, and in my application filed March 31, 1921, Serial No. 457,211, comprises a flanged pressure sustaining tube 1 closed at the ends by heads or caps 2 and 3 secured to the flanges of the tube 1 in any suitable manner, as by bolts, not shown. The caps 2 and 3 are provided with annular projections 4 engaging packing 5 in grooves 6 in the ends of the tube 1. The tube 1 and the caps 2 and 3 form a closed chamber 7 in which the caps 2 and 3 secure a corrugated sheet metal tube 8 closed by plugs 9 and 10. The plug 9 projects into the tube 8 and has mounted on its inner end a tube 11 which is open at its other end. The plug 10 has mounted thereon a tube 12 which surrounds the corrugated tube 8 and which is open at its other end. It will be noted that the tubes 8, 11 and 12 divide the chamber 7 into a plurality of chambers or passages, the annular passage 13 between the tubes 1 and 12 being in open communication around the open end of the tube 12 with the annular passage 14 between the tubes 8 and 12 and the annular passage 15 between the tubes 8 and 11 is in open communication with the interior of the tube 11 around the open end of the tube 11. The plug 10 also supports a tube 16 which is open at its other end and forms with the tube 11 an annular chamber 17 which is in open communication with the chamber 18 in the tube 16.

Projecting into the chamber 18 is a heating device, shown as an electrically heated resistance element 19, carried by a suitable support 20 secured to a plug 21 adapted to be inserted in an opening in the cap 3. Current for heating the element 19 is supplied by wires 22 which pass through openings in the plug 21. The cap 3 is also provided with a passage 23 which communicates with the chamber 17 through a passage 24 for the introduction of the catalytic agent, the passage 23 being normally closed by a plug 25 inserted in the opening in the cap 3. The catalytic agent may be withdrawn from the chamber 17 through a passage 26 in the plug 9 which connects with a passage 27 in the cap 2, the passage 27 being normally closed by a plug 28.

In the operation of my device, the mixture of hydrogen and nitrogen in the proper proportions is supplied by a supply pipe 36 and passes by a passage 37 in the cap 2 to a passage 38 in the plug 9 which communicates with both passages 13 and 14. The mixture then passes through the passage 14 to the passage 32 in the plug 10 which communicates with the chamber 18 in which the gases are heated by contact with the resistance element 19. From the chamber 18 the gases pass to the chamber 17 where the heated gases come in contact with the catalytic agent and the union of the gases is effected. From the chamber 17 the gases pass around the end of the tube 11 into the passage 15 from which they pass to a passage 33 in the plug 9 which communicates through a passage 34 in the cap 2 with a discharge pipe 35 which leads to the cooling and collecting chambers, not shown, in which the ammonia gas is condensed and separated from the uncombined gases.

It will be noted that the hot gases leaving the chamber 17 in which the catalytic action takes place pass out through the passage 15 while the cooler gases being supplied to the heating element 19 will fill the passage 13 and will pass through the passage 14 which is separated from the passage 15 only by the corrugated sheet metal tube 8 so that the incoming gases are heated to a considerable extent while the outgoing gases are cooled thus contributing to the final cooling and condensing of the ammonia gas and making it possible to reduce the amount of cooling apparatus that has heretofore been necessary. In this construction the passage 13 may be placed in communication with the passage 14 by means of openings 39 in the tube 12, adjacent to plug 10, as shown in dotted lines. Providing the openings 39 in the tube 12 permits of a stream of the cool gases passing through the passage 13 which is an effective means for insulating the tube 1 from the heat of the catalytic chamber.

In some cases it may be necessary or desirable to supply the mixture of gases to the other end of the tube 1, as shown in Fig. 2, in which cases the gases may be supplied through a supply pipe 29 connected to a passage 30 in the cap 3 which communicates with a passage 31 in the plug 10 leading to the passage 13. From the passage 13 the gases will pass around the end of the tube 12 into the passage 14 and thence into the chambers 18 and 17. Supplying the gases in this manner will also provide a layer of cooler incoming gases between the tube 12 and the tube 1 to insulate the tube 1 from the heat of the catalytic chamber. As shown in this figure a layer 40 of suitable heat insulating material may be placed in the passage 13 as an additional protection for the tube 1. In both the constructions described the tube 1 may be further protected by constructing the tube 12 wholly or in part of suitable refractory material. It will be noted however, that the tube 1 is exposed only to the temperature of the entering gases, which temperature will at all times be considerably lower than 400 degrees centigrade, thus keeping the temperature of the tube 1 within proper limits.

It will also be noted that the tubes 8, 11 and 12 are secured to the plugs 9 and 10 and may be inserted into the chamber 7 or withdrawn as a unit thus greatly facilitating repairs which may be made by substituting a new unit of plugs and tubes.

What I claim is:

1. In an apparatus for the synthesis of ammonia, a pressure sustaining tube having a chamber therein, a second tube mounted in said chamber, plugs closing the ends of said second tube and a tube mounted on each plug independently of the other plug.

2. In an apparatus for the synthesis of ammonia, a pressure sustaining tube having a chamber therein, a second tube mounted in said chamber, plugs closing the ends of said second tube, a tube mounted on one of said plugs and surrounding said second tube and a tube mounted on the other of said plugs and surrounded by said second tube.

3. In an apparatus for the synthesis of ammonia, a pressure sustaining tube having a catalytic chamber, means surrounding said catalytic chamber with the heated gases discharged from said catalytic chamber and means whereby the pressure sustaining tube is insulated from the heat of the discharged gases by the cooler gases supplied to said catalytic chamber.

4. In an apparatus for the synthesis of ammonia, a pressure sustaining tube having a catalytic chamber, an annular passage surrounding said catalytic chamber for the discharge of gases from said catalytic chamber and an annular passage surrounding the discharge passage for supplying the gases to the catalytic chamber.

5. In an apparatus for the synthesis of ammonia, a pressure sustaining tube having an annular catalytic chamber, an annular passage surrounding the catalytic chamber for the discharge of gases from the catalytic chamber and a plurality of concentric annular passages surrounding the discharge passage through which the gases supplied to the catalytic chamber pass.

6. In an apparatus for the snythesis of ammonia, a pressure sustaining tube having an annular catalytic chamber therein, a second chamber surrounded by said catalytic chamber, means in said second chamber for heating the gases supplied to said catalytic chamber and a plurality of annular inlet and discharge passages surrounding said catalytic chamber.

7. In an apparatus for the synthesis of ammonia, a pressure sustaining tube having a catalytic chamber therein, a gas inlet passage in said catalytic chamber, means mounted in said inlet passage for heating the gases supplied to said catalytic chamber, an annular passage for the discharge of gases from said catalytic chamber surrounding said catalytic chamber and means for heating the gases supplied to said catalytic chamber by the gases in said discharge passage.

8. In an apparatus for the synthesis of ammonia, a pressure sustaining tube having a catalytic chamber therein, a gas inlet passage in said catalytic chamber, an annular passage surrounding said catalytic chamber for the discharge of gases from said catalytic chamber, means for heating the gases supplied to said catalytic chamber by the gases in said discharge passage and means to insulate said pressure sustaining tube from the heat of the gases supplied to said tube.

9. In an apparatus for the synthesis of ammonia, a pressure sustaining tube having a catalytic chamber therein, a gas inlet passage in said catalytic chamber, an annular discharge passage surrounding said catalytic chamber, means for heating the gases supplied to said catalytic chamber by the gases in said discharge passage and means whereby the gases supplied to said catalytic chamber insulate the pressure sustaining tube from the heat of the gases heated by the discharged gases.

In testimony whereof I have hereunto signed my name.

LUIGI CASALE.

Witnesses:
G. B. ZEMARDO,
G. J. HANDY.